United States Patent
Griswold, Jr. et al.

(10) Patent No.: US 6,704,836 B1
(45) Date of Patent: Mar. 9, 2004

(54) METHOD FOR DYNAMIC CONTROL OF CONCURRENT EXTENDED COPY TASKS

(75) Inventors: Robert M. Griswold, Jr., Round Rock, TX (US); Steven A. Justiss, Lakeway, TX (US)

(73) Assignee: Crossroads Systems, Inc., Austin, TX (US)

(*) Notice: Subject to any disclaimer, the term of this patent is extended or adjusted under 35 U.S.C. 154(b) by 0 days.

(21) Appl. No.: 10/293,431

(22) Filed: Nov. 13, 2002

(51) Int. Cl.$^7$ .............................................. G06F 12/00
(52) U.S. Cl. ...................... 711/113; 711/162; 711/156; 711/111
(58) Field of Search ................................ 711/113, 162, 711/156, 111; 707/204; 714/6

(56) References Cited

U.S. PATENT DOCUMENTS

| | | | | | |
|---|---|---|---|---|---|
| 5,113,354 | A | * | 5/1992 | Harper et al. ................ 709/219 |
| 5,966,733 | A | * | 10/1999 | Brewer ........................ 711/170 |
| 6,650,656 | B2 | * | 11/2003 | Tyndall ....................... 370/470 |
| 2002/0144069 | A1 | * | 10/2002 | Arakawa et al. ............. 711/162 |
| 2002/0146035 | A1 | * | 10/2002 | Tyndall ....................... 370/465 |
| 2002/0156942 | A1 | * | 10/2002 | Tyndall ........................ 710/5 |
| 2002/0199073 | A1 | * | 12/2002 | Tamura et al. .............. 711/162 |
| 2003/0149830 | A1 | * | 8/2003 | Torr et al. ................... 711/100 |
| 2003/0167312 | A1 | * | 9/2003 | Mori .......................... 709/212 |
| 2003/0204597 | A1 | * | 10/2003 | Arakawa et al. ............ 709/226 |
| 2003/0212700 | A1 | * | 11/2003 | Basham ....................... 707/102 |

OTHER PUBLICATIONS

ANSI X3.131–1994, "American National Standard for Information Systems—Small Computer System Interface–2," pp. 1–2, 79–82, and 89–96, 1994.*

* cited by examiner

Primary Examiner—Matthew Kim
Assistant Examiner—Stephen Elmore
(74) Attorney, Agent, or Firm—Gray Cary Ware & Freidenrich, LLP

(57) ABSTRACT

Systems and methods for improving the performance and reliability of a copy manager by dynamically controlling performance of concurrent extended copy tasks. In one embodiment, the number of concurrent extended copy commands which are allowed to be active within a copy manager are dynamically adjusted based upon the resources available to service the commands (e.g., buffers available to store in-transit data). For example, the total number of data buffers, together with the number of buffers required to execute a single extended copy command, may be used to constrain the number of concurrent extended copy commands which are allowed to be active in the copy manager. Extended copy commands which are not active are held in queue for later execution.

27 Claims, 6 Drawing Sheets

METHOD FOR DYNAMIC CONTROL OF CONCURRENT EXTENDED COPY TASKS

FIELD OF THE INVENTION

The present invention relates generally to data communications systems and more particularly to mechanisms for improving the efficiency, stability, etc. of systems involved in the execution of concurrent extended copy tasks.

BACKGROUND OF THE INVENTION

The NCITS T10 SPC-2 (SCSI Primary Commands-2) Extended Copy command provides a method for computer backup applications to delegate actual data movement to third party devices known as copy managers. These copy managers typically reside in microprocessor-based, mass-storage related devices attached to a storage network. For example, a copy manager may reside in a router in a storage area network (SAN).

Copy managers move data from source devices to destination devices as designated by the backup application. The copy manager accepts extended copy commands, interprets them and generates the read and write commands necessary to carry out the extended copy command. Thus, for example, a copy manager in a router may read data from a disk drive into buffers in the router, and then write the data from the buffers to a tape drive. The tape drive is often on a SCSI bus, but it may also be resident on a Fibre Channel, iSCSI, Infiniband or alternative protocol network. The source disk may likewise be resident on a Fibre Channel, SCSI, iSCSI, Infiniband or alternative protocol network. While typical implementations are backup systems which may backup data from disk to tape, or which may restore from tape to disk, the invention is independent of the types of devices between which the data is moved, or the protocols according to which these devices operate.

The standard for the extended copy commands allows copy managers to handle multiple, concurrent extended copy sessions. In other words, a copy manager can orchestrate the movement of data from a multiple source devices to multiple destination devices concurrently.

The maximum number of concurrent extended copy sessions that can be supported is constrained by the capabilities of the hardware platform on which the copy manager runs. These capabilities relate to, e.g., microprocessor type and speed, internal data bus speed, and the amount of memory available for buffering the data in transit. Thus, even when the same software application is used to manage the extended copy sessions, the number of concurrent extended copy commands which are supported must be tailored to the capabilities of the underlying hardware. Additionally, the number of concurrent extended copy sessions may be affected by the level of non-extended-copy activity on the platform.

In order to make use of the copy manager, a host device must be made aware of the availability of the copy manager. The copy manager is therefore configured to provide an indication of its availability to the host devices that may access it. This information generally includes an indication of the number of concurrent extended copy tasks that may be executed. The indicated number is based upon the resources of the copy manager's platform, and is normally static. The host devices can then send up to the allowed number of concurrent extended copy commands to the copy manager for execution.

One of the problems with this arrangement is that, while the indication of the number of concurrent extended copy commands that can be handled by the copy manager is static, the actual availability of resources is not. In other words, conventional systems have static allocations of system resources designated for use by tasks that may become active within the system. The extended copy commands may require more or less than the allocated amount of resources. Extended copy commands may be sent to the copy manager by several host devices (which are not aware that they have to share the copy manager with other host devices), and the amount of resources used by non-extended copy commands may vary.

The fact that the copy manager may not have the expected availability of resources may cause problems because the copy manager typically has no means to cope with the situation. The copy manager is typically configured to execute the extended copy commands as they are received and may consequently become overloaded. This may cause instability or failure of the system.

SUMMARY OF THE INVENTION

One or more of the problems outlined above may be solved by the various embodiments of the invention. Broadly speaking, the invention comprises systems and methods for improving the performance and reliability of a copy manager by dynamically controlling concurrent extended copy tasks. In one embodiment, the number of concurrent extended copy commands which are allowed to be active within a copy manager is dynamically adjusted based upon total number of data buffers available to store in-transit data. The total number of data buffers available, together with the number of buffers required to execute a single extended copy command, may be used to constrain the number of concurrent extended copy commands which are allowed to be active in the copy manager. Extended copy commands which are not active are put in a queue for later execution.

One embodiment of the invention comprises an improved method for handling extended copy commands. This embodiment is implemented in a device such as a router. The router is initially in an idle state. When an extended copy command is received, the router determines the level of resources that are currently available. If there are sufficient resources to service the received extended copy command, the extended copy command is made active, and the corresponding extended copy tasks are carried out by the router. If the available resources are not sufficient to service the received extended copy command, the extended copy command is placed in a hold queue, where it remains until there are sufficient resources. When an active extended copy command is completed by the router, the resources that were being used to service the completed extended copy command are freed for use by other tasks. The router therefore checks the hold queue to determine whether there are any extended copy commands waiting to become active. If there are more extended copy commands to be executed, the router again checks to see if enough resources are available and, if there are enough resources, the next extended copy command is made active. The number of extended copy commands which are active is constrained by the availability of resources.

Another embodiment of the invention may comprise a router or other device configured to operate in accordance with the foregoing method. An exemplary prior art system has 64 entries in a queue. Extended copy command entries are activated eight at a time, without regard to the amount of resources used by any one of the commands. As a result, the system may underutilize or overutilize its resources, depending upon the amount of resources needed by the active extended copy commands. An exemplary embodiment of the present system also has 64 entries, but it does not necessarily activate eight entries at a time. It may have more or less than eight active extended copy commands, depending upon the amount of resources used by the commands. For example, if there are only two active extended copy commands, but each of these commands uses an extraordinarily large amount of resources, this may be the greatest possible number of active extended copy commands. If, on the other hand, there are eight extended copy commands which are active and each of which uses an unusually small amount of resources, it may be possible to make a number of additional extended copy commands active. This would allow the system to make use of the resources that would otherwise be unused by the first eight active extended copy commands.

Another embodiment of the invention comprises a software application. The software application is embodied in a computer-readable medium such as a floppy disk, CD-ROM, DVD-ROM, RAM, ROM, database schemas and the like. The computer readable medium contains instructions which are configured to cause a computer to execute a method which is generally as described above. It should be noted that the computer readable medium may comprise a RAM or other memory which forms part of a computer system. The computer system would thereby be enabled to perform a method in accordance with the present disclosure and is believed to be within the scope of the appended claims.

The present systems and methods may provide a number of advantages over prior art solutions. For example, the dynamic (rather than static) control of extended copy tasks may enable copy managers to handle more tasks if the tasks use less resources than might be expected. There is also less risk of the copy manager stalling if more tasks come in than can be concurrently handled. This makes the copy manager more stable and may therefore keep the device in which it is resident in its optimal performance mode. Still other advantages will be apparent to those of skill in the art.

Another embodiment comprises a method in which the maximum number of extended copy commands allowed to be active is limited by performance characteristics of the microprocessor, including, but not limited to the processor type, clock speed, amount of on-chip cache, manufacturing geometry, and L2 cache.

Numerous additional embodiments are also possible.

BRIEF DESCRIPTION OF THE DRAWINGS

Other objects and advantages of the invention may become apparent upon reading the following detailed description and upon reference to the accompanying drawings.

Figure 1:
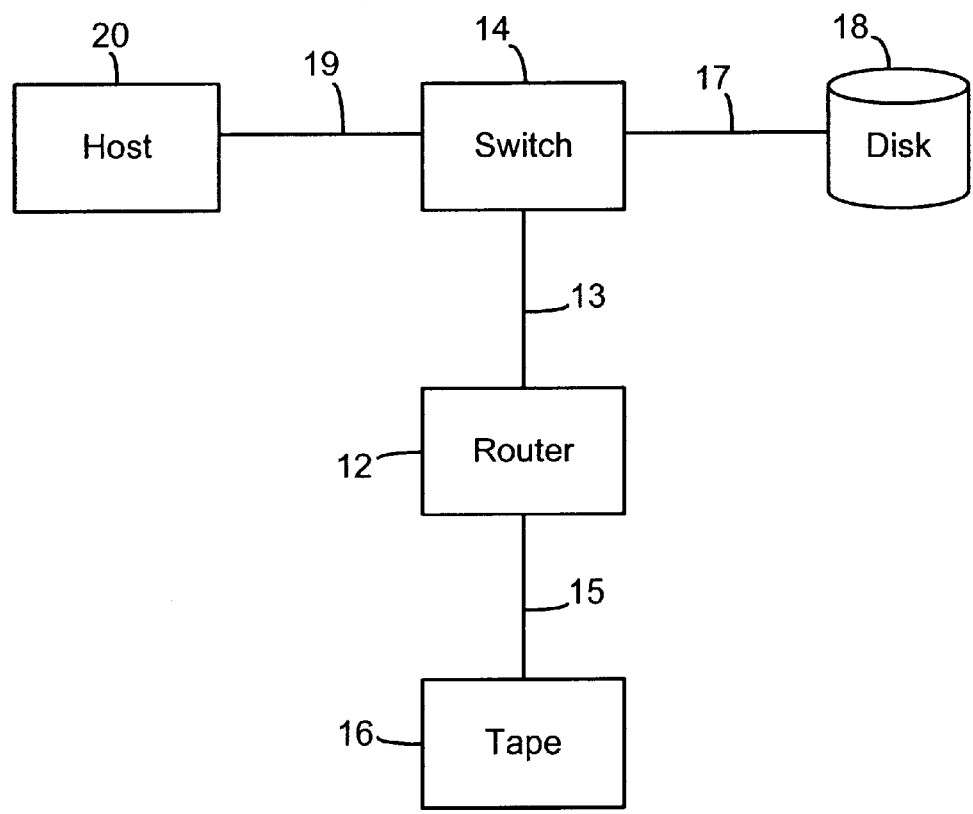
FIG. 1 is a block diagram illustrating the interconnection of the router with other network components in one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF A PREFERRED EMBODIMENT

A preferred embodiment of the invention is described below. It should be noted that this and any other embodiments described below are exemplary and are intended to be illustrative of the invention rather than limiting.

Broadly speaking, the invention comprises systems and methods for improving the performance and reliability of a copy manager by dynamically controlling concurrent extended copy tasks. In one embodiment, the number of concurrent extended copy commands which are allowed to be active within a copy manager are dynamically adjusted based upon total number of data buffers available to store in-transit data. The total number of data buffers available, together with the number of buffers required to execute a single extended copy command, may be used to constrain the number of concurrent extended copy commands which are allowed to be active in the copy manager. Extended copy commands which are not allowed to become active are left in the new copy command queue for later execution.

One embodiment of the invention is implemented in a router on a Fibre Channel network. Referring to FIG. 1, a block diagram illustrating the interconnection of the router with other network components in one embodiment is shown. In this embodiment, router 12 is coupled to a switch 14 by a Fibre Channel interconnect 13. Router 12 is coupled to a tape drive 16 by a SCSI interconnect 15. Switch 14 is coupled to hard disk drive 18 by Fibre Channel interconnect 17 and to host 20 by Fibre Channel interconnect 19.

It should be noted that, although the embodiment described in detail herein uses a router coupled to tape and disk drives by SCSI and Fibre Channel interconnects, alternative embodiments may use SAN attached appliances other than routers, and they may use other types of interconnects, including SCSI, iSCSI, InfiniBand, or any other interconnect that allows transport of NCITS T10 SCSI extended copy commands.

Host 20 is capable of accessing the other components of the network via the corresponding Fibre Channel interconnects. Particularly, host 20 is capable of accessing router 12 to delegate to it the management of copy tasks involving other network components, such as tape drive 16 and hard disk drive 18. This is accomplished through the use of extended copy commands issued by host 20 to router 12. Router 12 executes these extended copy commands, reading data from one of the network devices and writing (copying) the data to another one of the components.

The use of extended copy commands allows host 20 to use its own processing power on tasks other than the mere movement of data between network components. For example, it is possible for host 20 to back up hard disk drive 18 to tape drive 16 (a potentially very lengthy process) by issuing one or more corresponding extended copy commands to router 12. Router 12 can then copy the backup data from the hard disk drive to the tape drive without the intervention of host 20.

Figure 2:
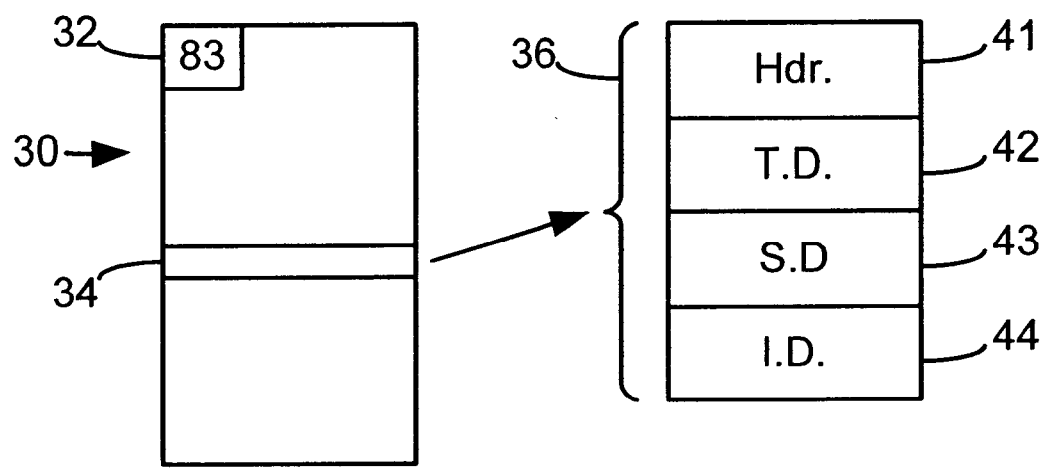
FIG. 2 is a diagram illustrating the general structure of an extended copy command in one embodiment.

Referring to FIG. 2, a diagram illustrating the general structure of an extended copy command in one embodiment is shown. As shown in the figure, the extended copy command 30 has an opcode 32. In this instance, the opcode is a hexadecimal "83". The command format includes a link or pointer list 34 which is a count of the size of a list 36 in the data. List 36 has a header 41, a set of target descriptors 42, a set of segment descriptors 43 and in-line data 44.

The part of header 41 which is primarily of interest is an indication of the length of the list.

The target descriptors 42 describe the target devices which will be involved in the extended copy task. The target devices typically include the source device and the destination device (i.e., the device from which data will be read and the device to which the data will be written). There may, however, be additional target descriptors, and the preferred embodiment makes provision for up to 64 target descriptors. Parameters in the target descriptor list may include such things as the address, name, size of data blocks, fixed-/variable-block mode, etc. for the target device.

The destination target device is typically a tape library. The source target device is typically a hard disk drive. The host is typically a Solaris box, a Windows 2000 server, or the like. The source, destination and host devices may, however, be any of a number of different devices. The router or other box in which the present invention is implemented may also vary from one embodiment to another. These devices may have different characteristics, such as the maximum amount of memory which is (or may be) available for transferring data using extended copy commands.

The segment descriptors 43 describe the types of operations that will be performed, as well as the amount of data that will be transferred. For example, a segment descriptor may indicate that block data will be read from a hard disk drive and written to a tape drive (both of which are referenced by the target descriptors), that is, a backup operation. Alternatively, the segment descriptors may describe backup operations, restore operations, block-to-block operations, etc. It should be noted that inline data (which may also be referred to as metadata) may or may not be present. Typically, for operations such as the backup of a disk to tape, the inline data is present. A preferred embodiment is an SPC-2 implementation which supports 8448 segment descriptors. Each of the segment descriptors can move up to 32 MB of data. Thus, a very large amount of data may potentially be moved through a single extended copy command.

In the preferred embodiment, the data is not read or written in 32 MB chunks. The data is instead read from a disk in chunks of 256 kB and then written to a tape in chunks of 64 kB. Internal buffers used in the preferred embodiment are 16 kB each, so each read command to the disk requires 16 buffers and each write command to the tape requires four buffers. This information is used to determine whether sufficient resources are available to activate additional extended copy commands.

It should also be noted that, in this embodiment, the buffers in which the data is stored have a low-water mark associated with them. After one or more read commands are issued and the corresponding data fills the buffers, write commands are issued to transfer data from the internal buffers to the destination device. These write operations continue until the number of buffers which contain data (which has not yet been transferred to the destination device) falls below the predetermined low-water mark. When the level of data in the buffers falls below the low-water mark, additional read commands are issued to obtain more data and store it in the buffers.

The inline data 44 is provided by the host application to describe the operations that will be done. This information may later be used, for example, to enable the backed up data to be restored from the tape to the disk. It should be noted that the SPC-2 standard also allows the use of embedded data segment descriptors to serve the same purpose as inline data segment descriptors.

Figure 3:
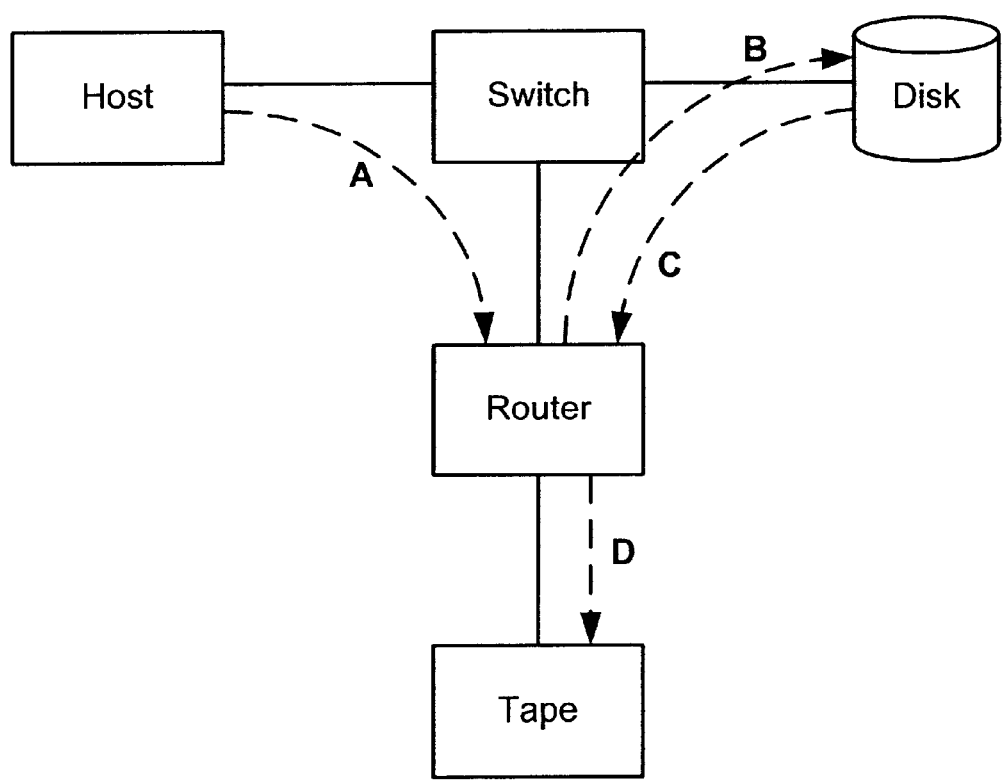
FIG. 3 is a diagram illustrating the flow of extended copy commands and corresponding data flow in one embodiment.

Referring to FIG. 3, a diagram illustrating the flow of extended copy commands and corresponding data flow is shown. FIG. 3 includes the network structure shown in FIG. 1, and also includes four lines depicting the flow of commands and data through the system during a backup operation that is performed using extended copy commands. Data flow A represents the issuance of an extended copy command from the host to the router. In this instance, the extended copy command instructs the router to back up data from the hard disk drive to the tape drive. When the router receives the extended copy command, it constructs a series of commands that will be issued to the hard drive to read data from it, as well as a series of commands that will be issued to the tape drive to write the hard drive's data to it. The read commands issued by the router to the hard disk drive are shown as data flow B. The data responsive to these read commands is shown as data flow C. Finally, the write commands issued by the router to the tape drive are shown as dataflow D.

When the extended copy command is executed, the copy manager identifies the target devices and goes through the segment descriptors sequentially. For each of the segment descriptors, the copy manager builds corresponding read commands to be issued to the source device and write commands to be issued to the destination device. When these read and write commands are issued to the respective devices, they serve to transfer data from the source device to the destination device.

Figure 4:
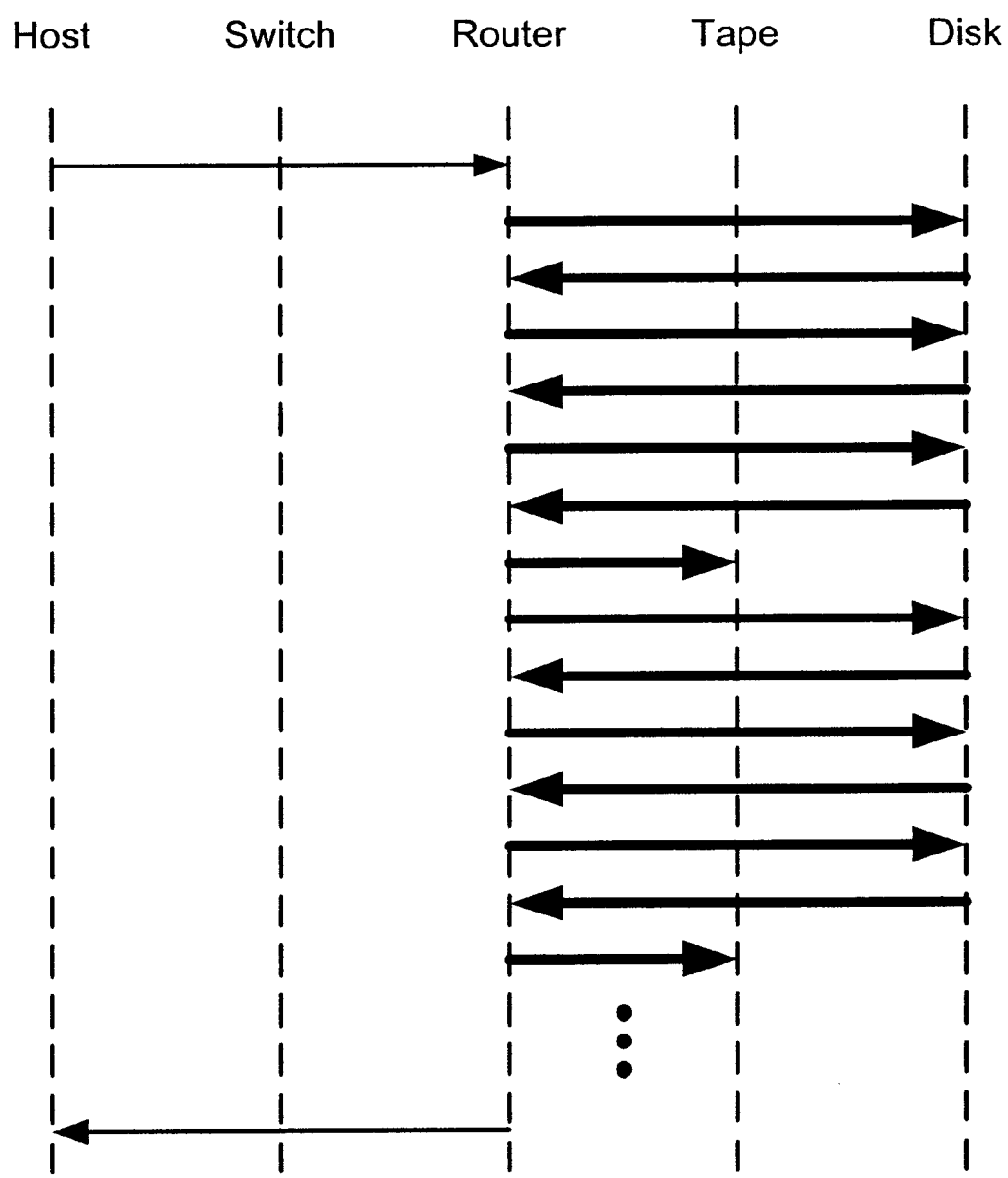
FIGS. 4 and 5 are two alternative diagrams illustrating the flow of data and commands between the various network components in one embodiment.
Figure 5:
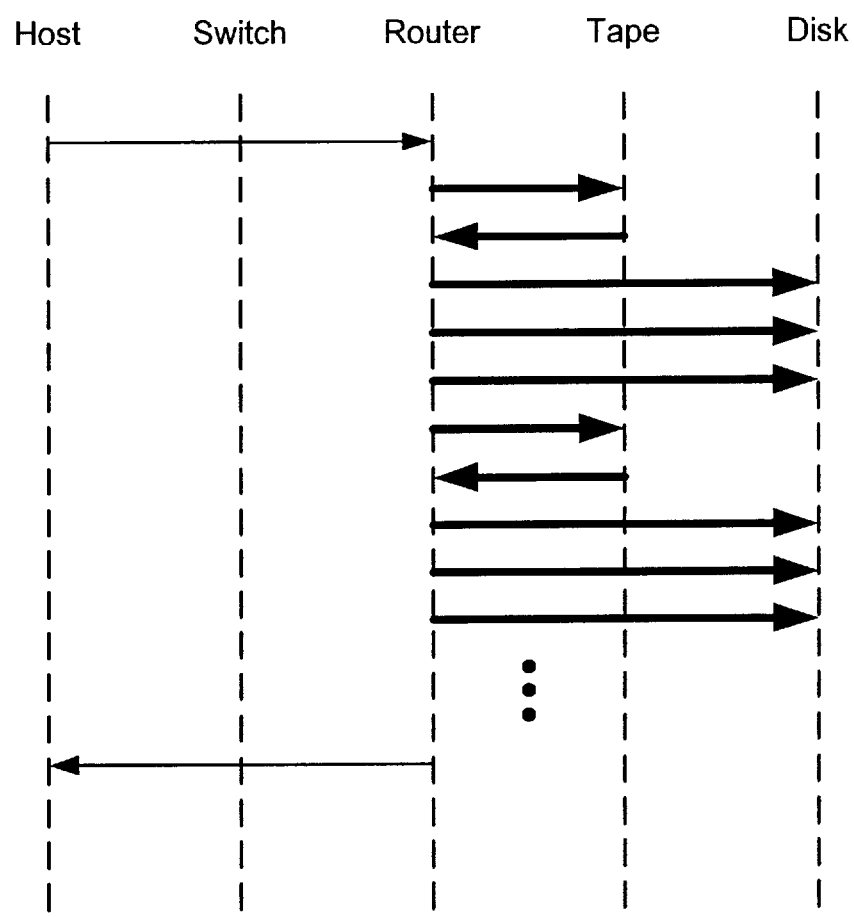

Referring to FIGS. 4 and 5, two alternative diagrams illustrating the flow of data and commands between the various network components is shown. Each of the components is represented by a vertical line in the figure. The flow of commands and/or data is depicted in the figure as arrows extending from the vertical line associated with one component to the vertical line associated with another component.

FIG. 4 illustrates the flow of data in a tape backup operation. It can be seen in the figure that the extended copy command corresponding to a backup command is first transmitted from the host through the switch and then to the router (data flow A). Then, the router, having constructed a series of read commands corresponding to the extended copy command, transmits these commands to the hard disk drive (data flow B). The hard disk drive subsequently transmits data responsive to the read commands to the router (data flow C). The router stores this data in its internal buffers until the data can be written to the tape drive (data flow D). This transfer of data from the hard disk to the router and then to the tape drive is repeated until the entire operation is complete. The router then transmits an indication to the host that the operation is complete.

It should be noted that the arrows corresponding to the data flows from the hard disk drive to the router and from the router to the tape drive are enlarged in comparison with the others. This is intended to illustrate the fact that the amount of data flowing from the hard disk drive to the router and then to the tape drive will likely be substantially greater than the amount flowing from the host to the router or from the router to the hard disk drive. By using the extended copy commands to delegate the transfer of data from the hard disk drive to the tape drive, the heavy data traffic between them is shifted so that it goes through the router instead of the host. Thus, the host is free to handle other tasks.

Referring to FIG. 5, a diagram similar to that of FIG. 4 is shown, but in this instance, the figure represents a restore operation rather than a backup operation. The operation therefore starts in the same way (i.e., the host issues one or more extended copy commands to the router and then the router manages the data transfer between network components), but the data flows from the tape drive to the hard disk drive instead of from the hard disk drive to the tape drive. Again, the arrows corresponding to the data flows from the tape drive to the disk drive are enlarged to indicate the greater amount of data being transferred.

Figure 6:
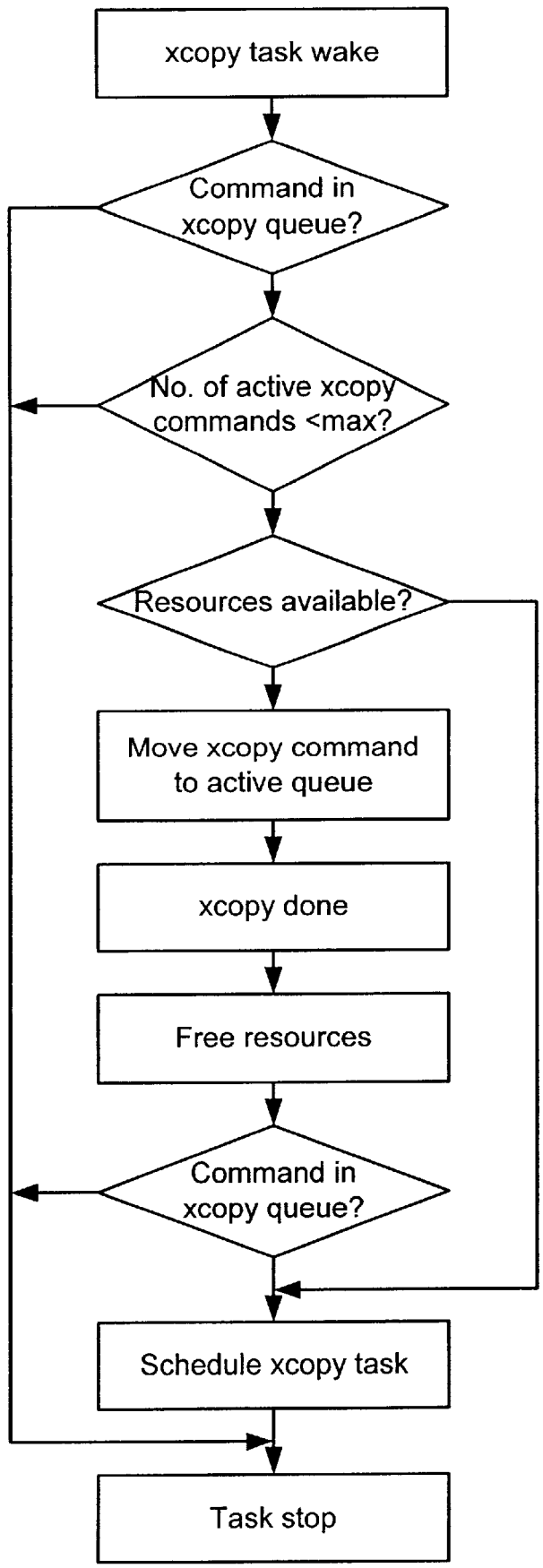
FIG. 6 is a flow diagram illustrating a method in accordance with one embodiment.

Referring to FIG. 6, a flow diagram illustrating a method in accordance with one embodiment of the invention is shown. The method of this embodiment is implemented in a router, similar to the embodiments described above. It is generically applicable to extended copy commands which cause the transfer of data between any two devices.

As shown in FIG. 6, the method begins in an idle state (with respect to the extended copy commands) until an extended copy command (Xcopy) is received. When the extended copy command is received, the router performs a calculation to determine the amount of resources which are available for use in executing the extended copy command. If resources are available for execution of the extended copy command, the extended copy command is put in an active queue and execution of the extended copy command begins. If there are not sufficient resources to begin execution of the extended copy command, it is put in the new xcopy queue, where it is held until resources become available.

When an extended copy command is put in the active queue, execution proceeds until it has been completed. When resources are no longer needed, they are released. For instance, intermediate data buffers are released when the data transfer is done. Resource availability can therefore actually fluctuate during the course of execution of a given extended copy command. Upon release of these resources, the router determines whether there are additional extended copy commands (either newly received or already being held in the new extended copy queue). If so, these extended copy commands are processed in the same manner as described above.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms 'comprises,' 'comprising,' or any other variations thereof, are intended to be interpreted as non-exclusively including the elements or limitations which follow those terms. Accordingly, a process, method, article, or apparatus that comprises a list of elements does not include only those elements but may include other elements not expressly listed or inherent to the claimed process, method, article, or apparatus.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method comprising:

receiving one or more extended copy commands from a host;

determining an amount of available resources;

determining, based upon the amount of available resources, a first portion of the one or more extended copy commands to be executed;

beginning execution of the first portion of the one or more extended copy commands; and storing in a queue a remaining portion of the one or more extended copy commands.

2. The method of claim 1, wherein as each extended copy command is received, the amount of available resources are determined and wherein the extended copy command is made active if there are sufficient resources available to service the extended copy command and the extended copy command is placed in the queue if there are insufficient resources available to service the extended copy command.

3. The method of claim 2, wherein determining the amount of available resources and activating or placing the extended copy command in the queue is performed for each extended copy command as it is received.

4. The method of claim 3, further comprising, if there is an extended copy command in the queue, determining whether there are sufficient resources available to service the queued extended copy command as resources are deallocated during execution of each active extended copy command, and activating the extended copy command if there are sufficient resources and holding the extended copy command in the queue if there are insufficient resources.

5. The method of claim 1, wherein determining the first portion of the one or more extended copy commands to be executed comprises selecting a plurality of the one or more extended copy commands that are expected to require no more than the amount of available resources.

6. The method of claim 1, wherein the method is implemented in a router.

7. The method of claim 1, wherein the method is implemented in a SAN attached appliance.

8. The method of claim 1, wherein determining the amount of available resources comprises determining a number of buffers which are available for data transfer tasks.

9. A device comprising:

a processor;

one or more working buffers;

a command queue; and one or more interfaces configured to couple the device to a host device, a source device and a destination device;

wherein the device is configured to receive extended copy commands from the host device, determine a number of working buffers available to service the received extended copy commands, execute a first portion of the received extended copy commands using the working buffers and place a remaining portion of the received extended copy commands in the command queue.

10. The device of claim 9, wherein the claimed device comprises a router.

11. The device of claim 9, wherein the claimed device comprises a switch.

12. The device of claim 9, wherein the claimed device comprises a SAN attached appliance.

13. The device of claim 9, wherein the interfaces are configured to couple the claimed device to a disk source device and a tape destination device.

14. The device of claim 9, wherein the interfaces are configured to couple the claimed device to a tape source device and a disk destination device.

15. The device of claim 9, wherein the interfaces are configured to couple the claimed device to a disk source device and a disk destination device.

16. The device of claim 9, wherein the interfaces are configured to couple the claimed device to a disk source device and an optical disk destination device.

17. The device of claim 9, wherein the interfaces are configured to couple the claimed device to an optical disk source device and a disk destination device.

18. The device of claim 9, wherein the one or more interfaces coupling the device to the host device, the source device and the destination device are selected from the group consisting of: a Fibre Channel interconnect; a SCSI bus; an iSCSI interconnect; an InfiniBand interconnect; and an interconnect that allows transport of NCITS T10 SCSI extended copy commands.

19. A software application embodied in a medium readable by a data processor, wherein the software application is operable to perform the following steps:

receiving one or more extended copy commands from a host;

determining an amount of available resources;

determining, based upon the amount of available resources, a first portion of the one or more extended copy commands that can be executed;

beginning execution of the first portion of the one or more extended copy commands; and storing in a queue a remaining portion of the one or more extended copy commands.

20. The software application of claim 19, wherein as each extended copy command is received, the software application is configured to determine amount of available resources and wherein the software application is configured to make the extended copy command active if there are sufficient resources available to service the extended copy command and to place the extended copy command in a queue if there are insufficient resources available to service the extended copy command.

21. The software application of claim 20, wherein the software application is configured to determine, for each extended copy command as it is received, the amount of available resources and activate or place the extended copy command in the queue.

22. The software application of claim 21, wherein the software application is configured to deallocate resources corresponding to completed extended copy commands and wherein, if there is an extended copy command in the queue, the software application is configured to determine whether there are sufficient resources available to service the extended copy command and to make the extended copy command active if there are sufficient resources and to keep the extended copy command in the queue if there are insufficient resources available.

23. The software application of claim 19, wherein the software application is configured to determine the first portion of the one or more extended copy commands to be executed by selecting a plurality of the one or more extended copy commands that are expected to require no more than the amount of available resources.

24. The software application of claim 19, wherein the software application is resident on a router.

25. The software application of claim 19, wherein the software application is resident on an intelligent switch.

26. The software application of claim 19, wherein the software application is resident on a SAN attached appliance.

27. The software application of claim 19, wherein the software application is configured to determine the amount of available resources by determining a number of buffers which are available for data transfer tasks.

* * * * *